(12) United States Patent
Ogawa et al.

(10) Patent No.: US 12,448,470 B2
(45) Date of Patent: Oct. 21, 2025

(54) POLYMERIZABLE COMPOSITION FOR OPTICAL MATERIAL, MOLDED PRODUCT, OPTICAL MATERIAL, AND PLASTIC LENS AND METHOD FOR MANUFACTURING SAME

(71) Applicant: MITSUI CHEMICALS, INC., Tokyo (JP)

(72) Inventors: Tatsuya Ogawa, Omuta (JP); Masayuki Furuya, Arao (JP)

(73) Assignee: MITSUI CHEMICALS, INC., Tokyo (JP)

(*) Notice: Subject to any disclaimer, the term of this patent is extended or adjusted under 35 U.S.C. 154(b) by 141 days.

(21) Appl. No.: 16/769,027

(22) PCT Filed: Dec. 5, 2018

(86) PCT No.: PCT/JP2018/044784
§ 371 (c)(1),
(2) Date: Jun. 2, 2020

(87) PCT Pub. No.: WO2019/111968
PCT Pub. Date: Jun. 13, 2019

(65) Prior Publication Data
US 2021/0230320 A1 Jul. 29, 2021

(30) Foreign Application Priority Data
Dec. 6, 2017 (JP) .................. 2017-234169

(51) Int. Cl.
*C08F 18/24* (2006.01)
*C08K 5/053* (2006.01)
*C09D 133/06* (2006.01)
*G02B 1/04* (2006.01)

(52) U.S. Cl.
CPC .............. *C08F 18/24* (2013.01); *C08K 5/053* (2013.01); *C09D 133/06* (2013.01); *G02B 1/041* (2013.01)

(58) Field of Classification Search
CPC ..................................... C08F 18/24
See application file for complete search history.

(56) References Cited

U.S. PATENT DOCUMENTS

| | | | |
|---|---|---|---|
| 2007/0181902 A1* | 8/2007 | Uchida | C08G 59/4215 257/787 |
| 2007/0242219 A1* | 10/2007 | Zanini | G02B 1/043 351/159.33 |
| 2018/0265674 A1 | 9/2018 | Ogawa et al. | |
| 2018/0364566 A1 | 12/2018 | Goto et al. | |
| 2019/0153131 A1 | 5/2019 | Ogawa et al. | |

FOREIGN PATENT DOCUMENTS

| | | | |
|---|---|---|---|
| CN | 1879041 A | 12/2006 | |
| EP | 35304 B2 * | 3/1989 | ............. C07C 68/06 |
| JP | H08127608 A | 5/1996 | |
| JP | 2005266794 A | 9/2005 | |
| JP | 2013213937 A | 10/2013 | |
| JP | 2017177717 A | 10/2017 | |
| WO | 2017047743 A1 | 3/2017 | |
| WO | 2017090725 A1 | 6/2017 | |
| WO | 2017150261 A1 | 9/2017 | |

OTHER PUBLICATIONS

Machine translation of JP2005266794 (Year: 2005).*
International Search Report (with English Translation) and Written Opinion issued on Mar. 12, 2019, for corresponding International Patent Application No. PCT/JP2018/044784, 9 pages.

* cited by examiner

Primary Examiner — Wenwen Cai
(74) Attorney, Agent, or Firm — BUCHANAN INGERSOLL & ROONEY PC

(57) ABSTRACT

A polymerizable composition for an optical material includes: an allyl carbonate compound (A) including two or more allyloxycarbonyl groups at a terminal which is represented by General Formula (1); and a radical polymerization initiator (B). The radical polymerization initiator (B) includes at least one kind of radical polymerization initiator (B1) which is a peroxyester-based radical polymerization initiator, and a radical polymerization initiator (B2).

9 Claims, No Drawings

POLYMERIZABLE COMPOSITION FOR OPTICAL MATERIAL, MOLDED PRODUCT, OPTICAL MATERIAL, AND PLASTIC LENS AND METHOD FOR MANUFACTURING SAME

TECHNICAL FIELD

The present invention relates to a polymerizable composition for an optical material, a molded product, an optical material, and a plastic lens and a method for manufacturing the same.

BACKGROUND ART

In comparison with inorganic lenses, plastic lenses are lighter, harder to break, and are able to be dyed and have thus rapidly become widespread as optical materials for spectacle lenses, camera lenses, and the like. So far, various molded products for lenses have been developed and used.

Among these, typical examples include an allyl resin obtained from diethylene glycol bisallyl carbonate and diallyl isophthalate, a (meth)acrylic resin obtained from (meth) acrylate, a polythiourethane resin obtained from isocyanate and thiol, and the like.

Among these, Patent Documents 1 and 2 describe techniques relating to lenses formed of allyl resin.

Patent Document 1 discloses a method for manufacturing a plastic lens having a high hardness and refractive index and little coloring by combining an allyl ester-based polymerizable compound, an aliphatic organic peroxide having a 10-hour half-life temperature of 75° C. or lower, and an aliphatic organic peroxide having a 10-hour half-life temperature of 80 to 100° C.

Patent Document 2 discloses a method for manufacturing a plastic lens for spectacles in which polymerization is carried out by a low temperature polymerization step of heating a raw material liquid including two kinds of radical polymerization initiators having different half-life temperatures in a low temperature region of less than 90° C. and a high temperature polymerization step of heating in a high temperature region of a range of 90° C. to 100° C. performed thereafter.

RELATED DOCUMENT

Patent Document

[Patent Document 1] Japanese Unexamined Patent Publication No. 8-127608
[Patent Document 2] Japanese Unexamined Patent Publication No. 2013-213937

SUMMARY OF THE INVENTION

Technical Problem

In both Patent Documents 1 and 2, a compound having a different 10-hour half-life temperature is used as a polymerization initiator together with the polymerizable component; however, according to investigations carried out by the present inventors, the physical properties of the lens are insufficient with the methods described in these documents, for example, foreign matter or turbidity may be generated on a surface or inside of the lens, cracks may be generated in the lens, and the product yield may decrease. Therefore, the present inventors carried out further investigations and found that using allyl carbonate compound and two types of specific radical polymerization initiator makes it possible to obtain a molded product having excellent surface hardness and color without impairing transparency and also to obtain a molded product in which the generation of leakage from a mold during polymerization and optical distortion are suppressed.

Solution to Problem

That is, it is possible to illustrate the present invention as follows.

[1] A polymerizable composition for an optical material, comprising:
an allyl carbonate compound (A) including two or more allyloxycarbonyl groups at a terminal which is represented by General Formula (1); and
a radical polymerization initiator (B),
wherein the radical polymerization initiator (B) includes at least one kind of radical polymerization initiator (B1) which is a peroxyester-based radical polymerization initiator in which a radical residual ratio after 5 hours at 50° C. is 10% or more and 90% or less, and which has an alkyl group having 5 or more carbon atoms and including a tertiary carbon atom directly connected to an 0-0 bond, and
a radical polymerization initiator (B2) in which a residual radical ratio after 5 hours at 95° C. is 10% or more and 90% or less and which is at least one kind selected from the group consisting of a peroxyester-based radical polymerization initiator, a peroxyketal-based radical polymerization initiator, and a peroxymonocarbonate-based radical polymerization initiator,

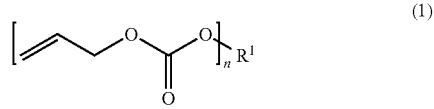

(1)

wherein, in General Formula (1), $R^1$ represents a divalent to 20 valent group derived from a chained or branched aliphatic polyol with 3 to 35 carbon atoms which optionally include a hetero atom, or a divalent to 20 valent group derived from a cycloaliphatic polyol with 5 to 40 carbon atoms which optionally include a hetero atom, n represents an integer of 2 to 20, and $R^1$ does not include an allyloxycarbonyl group.

[2] The polymerizable composition for an optical material according to [1],
wherein the allyl carbonate compound (A) includes at least one kind selected from the group consisting of a bis(allyl carbonate) compound of at least one kind of diol selected from the group consisting of diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2,6}$]tricyclodecane; a tris(allyl carbonate) compound of at least one kind of triol selected from the group consisting of glycerol, trimethylolpropane, and tris(hydroxyethyl) isocyanurate; a tetra(allyl carbonate) compound of at least one kind of tetraol selected from the group consisting of pentaerythritol, diglycerol, and ditrimethylolpropane; a hexa(allyl carbonate) compound of dipentaerythritol; and a hexa(allyl carbonate) compound of bispentaerythritol, the polymerizable composition for an optical material comprising the allyl carbonate compound (A) or a mixture of the allyl carbonate compound (A) and an oligomer thereof.

[3] The polymerizable composition for an optical material according to [1] or [2], wherein the allyl carbonate compound (A) is at least one kind selected from the group consisting of
(i) a diethylene glycol bis(allyl carbonate) compound,
(ii) a bis(allyl carbonate) compound of a mixture of diethylene glycol and neopentyl glycol,
(iii) a poly(allyl carbonate) compound of a mixture of diethylene glycol and tris(hydroxyethyl) isocyanurate,
(iv) a poly(allyl carbonate) compound of a mixture of diethylene glycol and trimethylolpropane,
(v) a poly(allyl carbonate) compound of a mixture of diethylene glycol and pentaerythritol,
(vi) a poly(allyl carbonate) compound of a mixture of diethylene glycol, neopentyl glycol and pentaerythritol, and
(vii) a poly(allyl carbonate) mixture including a poly(allyl carbonate) compound of a mixture of diethylene glycol, neopentyl glycol, and pentaerythritol, and a diethylene glycol bis(allyl carbonate) compound, the polymerizable composition for an optical material including a mixture of the allyl carbonate compound (A) and an oligomer thereof.

[4] The polymerizable composition for an optical material according to any one of [1] to [3], further comprising:
a polyol compound (E) represented by General Formula (a);

[6] An optical material comprising: the molded product according to [5].

[7] A plastic lens comprising: the molded product according to [5].

[8]. A plastic polarizing lens, comprising:
a polarizing film; and
a base layer comprised of the molded product according to [5] and formed over at least one surface of the polarizing film.

[9] A method for manufacturing a plastic lens, comprising:
a step of preparing a polymerizable composition for an optical material by mixing an allyl carbonate compound (A) including two or more allyloxycarbonyl groups at a terminal which is represented by General Formula (1) with a radical polymerization initiator (B); and
a step of forming a lens base material by cast polymerization of the polymerizable composition for an optical material,
wherein the radical polymerization initiator (B) includes at least one kind of radical polymerization initiator (B1) which is a peroxyester-based radical polymerization initiator in which a radical residual ratio after 5 hours at 50° C. is 10% or more and 90% or less and which has an alkyl group having 5 or more carbon atoms and including a tertiary carbon atom directly connected to an O—O bond, and
a radical polymerization initiator (B2) in which a residual radical ratio after 5 hours at 95° C. is 10% or more and 90% or less and which is at least one kind selected from the group consisting of a peroxyester-based radical polymerization initiator, a peroxyketal-based radical polymerization initiator, and a peroxymonocarbonate-based radical polymerization initiator,

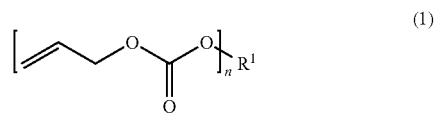

(1)

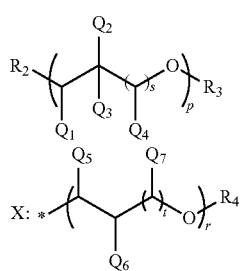

wherein, in General Formula (a), $R_2$ represents a hydroxyl group, an —OX group, or a linear or branched alkyl group having 1 to 4 carbon atoms, $R_3$ represents a hydrogen atom, an X group, or a linear or branched alkyl group having 1 to 4 carbon atoms, $R_4$ represents a hydrogen atom or a linear or branched alkyl group having 1 to 4 carbon atoms, $Q_1$ to $Q_7$ each independently represent a hydrogen atom, a linear or branched alkyl group having 1 to 4 carbon atoms, a —CH$_2$—OX group, or a —OX group, p represents an integer of 1 to 4, s represents an integer of 0 to 4, t represents an integer of 0 to 4, r represents an integer of 1 or more and 1000 or less, a plurality of $Q_1$ to $Q_7$, X, s, and t may be the same or different, and * represents a bond.

[5] A molded product obtained by curing the polymerizable composition for an optical material according to any one of [1] to [4].

wherein, in General Formula (1), $R^1$ represents a chained or branched divalent to 20 valent group derived from an aliphatic polyol with 3 to 35 carbon atoms which optionally include a hetero atom, or a divalent to 20 valent group derived from a cycloaliphatic polyol with 5 to 40 carbon atoms which optionally include a hetero atom, n represents an integer of 2 to 20, and $R^1$ does not include an allyloxycarbonyl group.

In the present invention, for example, "a diol bis(allyl carbonate) compound" means a compound having a structure in which two hydroxyl groups of a diol are replaced with allyl carbonate groups. One kind of diol may be used or two or more kinds may be used in combination.

In addition, in the present invention, for example, "a bis(allyl carbonate) compound of a mixture of diethylene glycol and neopentyl glycol" means either one of (1) a compound having a structure in which two hydroxyl groups of diethylene glycol are replaced with allyl carbonate groups; and (2) a compound having a structure in which two hydroxyl groups of neopentyl glycol are replaced with allyl carbonate groups; or a mixture thereof.

In addition, in the present invention, for example, "an oligomer of a bis(allyl carbonate) compound of a mixture of diethylene glycol and neopentyl glycol" means any one of the following (3), (4), or (5), or a mixture of two or more kinds selected from the above.

(3) Oligomer of Bis(Allyl Carbonate) Compound of Diethylene Glycol

A compound having a structure in which two or more molecules of diethylene glycol are oligomerized via a carbonate bond and a terminal hydroxyl group is substituted with an allyl carbonate group.

(4) Oligomer of Bis(Allyl Carbonate) Compound of Neopentyl Glycol

A compound having a structure in which two or more molecules of neopentyl glycol are oligomerized via a carbonate bond and a terminal hydroxyl groups are substituted with an allyl carbonate group.

(5) Oligomer of Bis(Allyl Carbonate) Compound of Diethylene Glycol and Neopentyl Glycol A compound having a structure in which one molecule or more of diethylene glycol and one molecule or more of neopentyl glycol are oligomerized in the same molecule in a random combination via a carbonate bond and a terminal hydroxyl group is substituted with an allyl carbonate group.

The same also applies to a case of a "bis(allyl carbonate) compound of a trifunctional or higher polyol" and a "bis(allyl carbonate) compound using two or more kinds of diols and trifunctional or higher polyols".

In a case of "an oligomer of a bis(allyl carbonate) compound of a trifunctional or higher polyol" and "an oligomer of a bis(allyl carbonate) compound using two or more kinds of diols and trifunctional or higher polyols", a structure in which all terminal hydroxyl groups are substituted with an allyloxycarbonate group and a structure in which some of the terminal hydroxyl groups are substituted with an allyloxycarbonate group are included.

In addition, in the present invention, for example, "1 to 10" means "1 or more and 10 or less".

In addition, in the present invention, a hetero atom means an atom other than C and H.

Advantageous Effects of Invention

According to the polymerizable composition for an optical material of the present invention, it is possible to obtain a molded product having excellent surface hardness and color without impairing the transparency and also a molded product in which the generation of leakage from a mold during polymerization and optical distortion are suppressed.

DESCRIPTION OF EMBODIMENTS

A description will be given of the polymerizable composition for an optical material of the present invention based on the following embodiments.

The polymerizable composition for an optical material of the present embodiment includes an allyl carbonate compound (A) represented by General Formula (1) and including at least two allyloxycarbonyl groups at a terminal, and a radical polymerization initiator (B).

The radical polymerization initiator (B) includes at least one kind of radical polymerization initiator (B1) which is a peroxyester-based radical polymerization initiator in which a radical residual ratio after 5 hours at 50° C. is 10% or more and 90% or less and having an alkyl group having 5 or more carbon atoms and including a tertiary carbon atom directly connected to an O—O bond, and a radical polymerization initiator (B2) in which a residual radical ratio after 5 hours at 95° C. is 10% or more and 90% or less and which is at least one kind selected from the group consisting of a peroxyester-based radical polymerization initiator, a peroxyketal-based radical polymerization initiator, and a peroxymonocarbonate-based radical polymerization initiator.

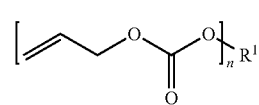

(1)

In General Formula (1), $R^1$ represents a chained or branched divalent to 20 valent group derived from an aliphatic polyol with 3 to 35 carbon atoms which optionally include a hetero atom, or a divalent to 20 valent group derived from a cycloaliphatic polyol with 5 to 40 carbon atoms which optionally include a hetero atom. n represents an integer of 2 to 20. $R^1$ does not include an allyloxycarbonyl group.

The polymerizable composition for an optical material of the present embodiment including the components (A), (B1) and (B2) makes it possible to suppress the generation of leakage from the mold during the polymerization, and to suppress optical distortion of the optical material obtained by the polymerization. Also, for example, the moldability is excellent and it is possible to improve the product yield. In addition, according to the polymerizable composition for an optical material of the present embodiment, it is also possible to obtain a molded product having excellent surface hardness and color without impairing transparency. For this reason, it is possible to obtain a molded product suitable as an optical material such as a plastic lens.

In addition, according to the present embodiment, using the components (A), (B1), and (B2) in combination also makes it possible to suppress the deterioration of the additives during the polymerization, such that it is possible to use various additives.

Here, "leakage from the mold during polymerization" is a phenomenon in which the polymerizable composition cast into the mold, for example, thermally expands and leaks out from gaps of the mold in the oven.

In addition, optical distortion is distortion which is able to be found by visual observation using a distortion inspection device SVP-100 manufactured by Toshiba Corporation.

Description will be given below of each component.

[Allyl Carbonate Compound (A)]

In the present embodiment, the allyl carbonate compound (A) is a compound including two or more allyloxycarbonyl groups at a terminal and is represented by General Formula (1).

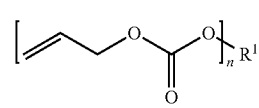

(1)

In General Formula (1), $R^1$ represents a chained or branched divalent to 20 valent group derived from an aliphatic polyol with 3 to 35 carbon atoms which optionally include a hetero atom, or a divalent to 20 valent group derived from a cycloaliphatic polyol with 5 to 40 carbon atoms which optionally include a hetero atom. n represents an integer of 2 to 20. $R^1$ does not include an allyloxycarbonyl group.

Together with the allyl carbonate compound (A), it is possible for the polymerizable composition for an optical material of the present embodiment to include an oligomer thereof.

The oligomer is, for example, a poly(allyl carbonate) in which two or more molecules of polyol are linked via a carbonate bond, which is created by a transesterification reaction between diallyl carbonate and a polyol.

Usually, it is possible for this polyol to have 2 or more and 8 or less hydroxyl groups in the molecule, preferably 2 or more and 6 or less. The allyl carbonate compound is a poly(allyl carbonate) of a chained or branched chain aliphatic polyol with 3 or more and 35 or less carbon atoms. A poly(allyl carbonate) of a cycloaliphatic polyol with 5 or more and 40 or less carbon atoms in the molecule is also suitable as component (A). It is also possible to use a mixed poly(allyl carbonate), that is, a mixture derived from two or more polyols and able to be obtained by mixing poly(allyl carbonate) of single polyols or a mixture which is able to be directly obtained by a chemical reaction started from a mixture of polyols and diallyl carbonate, as component (A). Finally, it is possible for all these poly(allyl carbonates) to be in the form of monomers or mixtures of monomers and oligomers.

Specific examples of the polyol forming $R^1$ of General Formula (1) include diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, 4,8-bis(hydroxymethyl)-[5.2.1.0$^{2,6}$]tricyclodecane, glycerol, trimethylolpropane, tris(hydroxyethyl) isocyanurate, pentaerythritol, diglycerol, ditrimethylolpropane, dipentaerythritol, bis pentaerythritol, and the like.

Accordingly, the allyl carbonate compound (A) includes at least one kind selected from the group consisting of:
bis(allyl carbonate) compound of at least one kind of diol selected from the group consisting of diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2,6}$]tricyclodecane;
tris(allyl carbonate) compound of at least one kind of triol selected from the group consisting of glycerol, trimethylolpropane, and tris(hydroxyethyl) isocyanurate;
tetra(allyl carbonate) compound of at least one kind of tetraol selected from the group consisting of pentaerythritol, diglycerol, and ditrimethylolpropane;
a hexa(allyl carbonate) compound of dipentaerythritol; and a hexa(allyl carbonate) compound of bispentaerythritol.

The allyl carbonate compound (A) and oligomers thereof are a mixed poly(allyl carbonate) compound or the like of at least two or more kinds of compounds selected from the group consisting of the diols, the triols, the tetraols, the dipentaerythritols, and the bispentaerythritols.

When the "mixed poly(allyl carbonate) compound of at least two or more kinds of compounds" is explained based on "bis(allyl carbonate) of a mixture of at least two kinds of diols", for example, in a case where the diols are diethylene glycol and neopentyl glycol, it is obtained as a mixture of the following monomer components (allyl carbonate compound (A)) and oligomer components.

Monomer Components
(1) Diethylene glycol bis(allyl carbonate)
(2) Neopentyl glycol bis(allyl carbonate)
Oligomer Components
(3) Oligomer including only hydrocarbon (and ether) derived from diethylene glycol (a compound having a structure in which two hydroxyl groups of a compound, in which diethylene glycol is linearly oligomerized via a carbonate bond, are replaced with allyl carbonate groups)
(4) Oligomer including only a hydrocarbon derived from neopentyl glycol (a compound having a structure in which two hydroxyl groups of a compound, in which neopentyl glycol is linearly oligomerized via a carbonate bond, are replaced with allyl carbonate groups)
(5) Complex oligomers including both hydrocarbons (and ethers) derived from diethylene glycol and hydrocarbons derived from neopentyl glycol in the same molecule (a compound having a structure in which two hydroxyl groups of a compound, in which diethylene glycol and neopentyl glycol are linearly oligomerized via a carbonate bond in an arbitrary arrangement in the same molecule, are replaced with allyl carbonate groups)

The following are suitable examples of the allyl carbonate compound (A) and oligomers thereof in the present embodiment and at least one kind selected from the following is included.
(i) Bis(allyl carbonate) compound of diethylene glycol, that is, a mixture of diethylene glycol bis(allyl carbonate) and an oligomer thereof.

It is possible to define the diethylene glycol bis(allyl carbonate) by Formula (I).

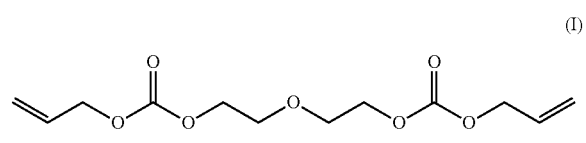 [SMILES: C=CCOC(=O)OCCOCCOC(=O)OCC=C]

In addition, it is possible to define an oligomer of diethylene glycol bis(allyl carbonate) by General Formula (II).

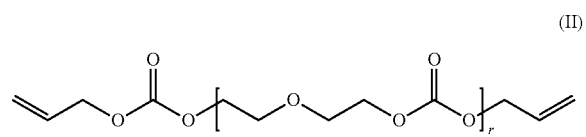

In General Formula (II), r is 2 or more and 10 or less.

It is possible to manufacture the compound shown in Formula (I) by reacting diethylene glycol bis(chloroformate) with allyl alcohol as described, for example, in "Encyclopedia of Chemical Technology", Kirk-Othmer, version III, Volume 2, pages 111-112. It is possible to easily manufacture a mixture of diethylene glycol bis(allyl carbonate) (Formula (I)) and an oligomer thereof (Formula (II)), for example, by transesterification of diallyl carbonate and diethylene glycol by operating in the presence of a basic catalyst as described in European Patent No. 35, 304. These mixtures usually include up to approximately 80% by weight of oligomers.
(ii) A mixture of a bis(allyl carbonate) compound of a mixture of diethylene glycol and neopentyl glycol and an oligomer thereof This bis(allyl carbonate) compound is the same as the diethylene glycol bis(allyl carbonate) compound in (i) described above, except that diethylene glycol is substituted with a mixture of diethylene glycol and neopentyl glycol.

(iii) A mixture of a poly(allyl carbonate) compound of a mixture of diethylene glycol and tris(hydroxyethyl) isocyanurate and an oligomer thereof It is possible to obtain the poly(allyl carbonate) compound by transesterification of a diallyl carbonate of a mixture of diethylene glycol and tris(hydroxyethyl) isocyanurate, for example, as described in U.S. Pat. No. 4,812,545.

(iv) A mixture of a poly(allyl carbonate) compound of a mixture of diethylene glycol and trimethylolpropane and an oligomer thereof This poly(allyl carbonate) compound is the same as the poly(allyl carbonate) compound in (iii) described above, except that the tris(hydroxyethyl) isocyanurate is substituted with trimethylolpropane.

(v) A mixture of a poly(allyl carbonate) compound of a mixture of diethylene glycol and pentaerythritol and an oligomer thereof This poly(allyl carbonate) compound is the same as the poly(allyl carbonate) compound in (iii) described above, except that the tris(hydroxyethyl) isocyanurate is substituted with pentaerythritol.

(vi) A mixture of a poly(allyl carbonate) compound of a mixture of diethylene glycol, neopentyl glycol, and pentaerythritol and an oligomer thereof This poly(allyl carbonate) compound is the same as the poly(allyl carbonate) compound in (v) described above, except that diethylene glycol is substituted with two kinds of diols of diethylene glycol and neopentyl glycol.

(vii) A poly(allyl carbonate) mixture including a mixture of a poly(allyl carbonate) compound of a mixture of diethylene glycol, neopentyl glycol, and pentaerythritol and an oligomer thereof, and a mixture of a bis(allyl carbonate) compound of diethylene glycol and an oligomer thereof This poly(allyl carbonate) mixture is a mixture of the above (vi) and the above (i).

In the present embodiment, the content of "the allyl carbonate compound (A) or a mixture of the allyl carbonate compound (A) and an oligomer thereof" in the polymerizable composition for an optical material (collectively referred to below as an allyl carbonate compound (A)) is 70.0% by weight or more and 99.7% by weight or less with respect to 100% by weight of the polymerizable composition for an optical material, and preferably 80.0% by weight or more and 99.5% by weight or less, from the viewpoint of obtaining an optical resin having good transparency and excellent thermophysical properties and mechanical properties.

The polymerizable composition for an optical material of the present embodiment does not include a (meth)acrylate compound including two or more (meth)acryl groups.

[Radical Polymerization Initiator (B)]

In the present embodiment, the radical polymerization initiator (B) includes the following radical polymerization initiator (B1) and radical polymerization initiator (B2).

Radical polymerization initiator (B1): At least one kind of peroxyester-based radical polymerization initiator in which a radical residual ratio after 5 hours at 50° C. is 10% or more and 90% or less and in which an alkyl group directly connected to an O—O bond has a tertiary alkyl group having 5 or more carbon atoms.

Radical polymerization initiator (B2): At least one kind selected from the group consisting of a peroxyester-based radical polymerization initiator, a peroxyketal-based radical polymerization initiator, and a peroxymonocarbonate-based radical polymerization initiator, in which a radical residual ratio after 5 hours at 95° C. is 10% or more and 90% or less.

Here, the residual ratio of the radical polymerization initiator (B1) and the radical polymerization initiator (B2) described below may be determined as follows.

First, a thermal decomposition rate kd of the radical polymerization initiator at a predetermined temperature T is calculated by the following equation.

$$k_d = A\exp(-\Delta E/RT)$$

A: Frequency factor
$\Delta E$: Activation energy
R: Gas constant (8.314 J/mol K)
T: Absolute temperature (T)

Then, using the thermal decomposition rate kd described above, it is possible to calculate the residual ratio of the radical polymerization initiator after the reaction for t hours at the predetermined temperature T.

$$\text{Residual ratio } (\%) = \exp(-kdt) \times 100$$

t: Time (hr)

In the present embodiment, using the radical polymerization initiator (B2) makes it possible to obtain a lens having excellent transparency, high surface hardness, and good physical properties, and further, using the radical polymerization initiator (B1) makes it possible to suppress optical distortion, monomer leakage, lens cracks, and the like, and to obtain a lens having good physical properties. In addition, using the components (A), (B1), and (B2) makes it possible to greatly improve, for example, the product yield.

(Radical Polymerization Initiator (B1))

The radical polymerization initiator (B1) is a peroxyester-based radical polymerization initiator in which a radical residual ratio after 5 hours at 50° C. is 10% or more and 90% or less, and preferably 20% or more and 90% or less, and which has a tertiary alkyl group having 5 carbon atoms or more in which the alkyl group is directly connected to an O—O bond, preferably an alkyl group having 5 carbon atoms or more including a tertiary carbon atom directly bonded to an O—O bond, and more preferably an alkyl group having 5 carbon atoms including a tertiary carbon atom directly connected to an O—O bond.

In addition, the radical polymerization initiator (B1) has a radical residual ratio after 5 hours at 55° C. of 1% or more and 90% or less, and preferably 5% or more and 80% or less.

In the following, the numerical values in parentheses represent "radical residual ratio after 5 hours at 50° C.", and "radical residual ratio after 5 hours at 55° C." in order.

Examples of the peroxyester-based radical polymerization initiator used as the radical polymerization initiator (B1) include t-hexylperoxypivalate (82.9%, 69.2%), t-hexylperoxyneodecanoate (48.9%, 25.9%), 1,1,3,3-tetramethylbutylperoxyneodecanoate (27.2%, 7.9%), t-amylperoxyneodecanoate (54.5%, 30.1%), t-amylperoxypivalate (83.7%, 70.7%), and the like.

(Radical Polymerization Initiator (B2))

The radical polymerization initiator (B2) is at least one kind of radical polymerization initiator selected from the group consisting of a peroxyester-based radical polymerization initiator, a peroxyketal-based radical polymerization initiator, and a peroxymonocarbonate-based radical polymerization initiator, in which the radical residual ratio after 5 hours at 95° C. is 10% or more and 90% or less, and preferably 20% or more and 90% or less.

In addition, the radical polymerization initiator (B2) has a radical residual ratio after 5 hours at 100° C. of 1% or more and 90% or less, and preferably 5% or more and 80% or less.

In the following, the numerical values in parentheses represent "radical residual ratio after 5 hours at 95° C." and "radical residual ratio after 5 hours at 100° C.".

Examples of the peroxyester-based radical polymerization initiator include, for example, t-butylperoxyperoxylaurate (79.0%, 64.7%), t-butylperoxyisobutyrate, t-butylperoxy-3,3,5-trimethylhexanoate (76.3%, 62.6%), t-butylperoxyacetate (86.9%, 76.3%), t-butylperoxyisononanoate (85.9%, 76.0%), t-butylperoxybenzoate (81.7%, 68.7%), t-amylperoxy normal octanoate (73.6%, 53.1%), t-amylperoxyacetate (82.8%, 70.7%), t-amylperoxyisononanoate (73.88, 55.8%), t-amylperoxybenzoate (82.3%, 70.7%), t-hexylperoxybenzoate (81.7%, 68.7%), and the like.

Examples of peroxyketal-based radical polymerization initiators include 1,1-di(t-amylperoxy)cyclohexane (63.8%, 42.9%), 1,1-di(t-hexylperoxy)cyclohexane (37.1%, 17.3%), 1,1-di(t-butylperoxy)cyclohexane (57.9%, 37.9%), 1,1-di(t-butylperoxy)-3,3,5-trimethylcyclohexane (33.3%, 14.6%), n-butyl-4,4-di(t-butylperoxy) valerate (88.9%, 81.1%), 2,2-bis(4,4-di-t-butylperoxycyclohexyl) propane (69.3%, 50.7%), 2,2-di(t-butylperoxy) butane (88.8%, 79.3%), and the like.

Examples of peroxymonocarbonate-based radical polymerization initiators include t-butylperoxyisopropyl carbonate (81.0%, 67.6%), t-butylperoxy-2-ethylhexyl carbonate (82.3%, 70.7%), t-amylperoxyisopropyl carbonate (73.78, 56.1%), t-amylperoxy-2-ethylhexyl carbonate (80.9%, 67.6%), and the like.

In the present embodiment, the addition amounts of the radical polymerization initiators (B1) and (B2) vary depending on the polymerization conditions, the type of the initiator, and the composition of the compound (A) and are not to be limited; however, it is possible to include the radical polymerization initiator (B1) as 0.1 parts by weight or more and 1.0 part by weight or less with respect to 100 parts by weight of the allyl carbonate compound (A), preferably 0.2 parts by weight or more and 0.7 parts by weight or less, and even more preferably 0.3 parts by weight or more and 0.5 parts by weight or less, and to include the radical polymerization initiator (B2) as 0.2 parts by weight or more and 3.0 parts by weight or less, preferably 0.3 parts by weight or more and 2.5 parts by weight or less, and even more preferably 0.4 parts by weight or more and 2.0 parts by weight or less. It is possible to appropriately combine the ranges described above. From the viewpoint of storage stability and handling of the radical polymerization initiator, a diluent or an additive which does not participate in polymerization may be appropriately included, but in calculation of the addition amounts described above, the diluent and the additive are calculated as not included.

In addition, when polymerizing the polymerizable composition for an optical material of the present embodiment, among the polymerization conditions, in particular, the temperature affects the properties of the obtained cured product. Since the temperature condition is affected by the type and amount of the radical polymerization initiator (B) and the type of the monomer, there are no unconditional limitations thereon; however, generally, the polymerization is started at a relatively low temperature and curing at a high temperature when the polymerization is completed is suitable. Since the polymerization time also varies depending on various factors in the same manner as the temperature, determining an optimum time in advance according to these conditions is suitable; however, generally, it is preferable to choose conditions such that the polymerization is completed in 12 hours or more and 72 hours or less. In addition, it is not necessary to strictly control the polymerizable composition for an optical material of the present embodiment to be 35° C. or lower and curing is possible even with a pattern of starting from 40° C. or higher.

Since the polymerizable composition for an optical material of the present embodiment includes an allyl carbonate compound (A) and a radical polymerization initiator (B) including radical polymerization initiators (B1) and (B2), the generation of leakage from the mold during polymerization is suppressed and it is possible to provide a polymerizable composition for an optical material excellent in resin molded product productivity. In addition, according to the present embodiment, it is possible to obtain a molded product having excellent surface hardness and color in which optical distortion is suppressed without impairing transparency, for example, it is also possible to obtain an optical material having excellent optical characteristics such as the refractive index and Abbe number. Thus, according to the present embodiment, it is possible to obtain a molded product having excellent productivity and excellent optical properties.

In the present embodiment, the polymerizable composition for an optical material may include components other than the components (A) and (B) described above. According to the present embodiment, when the polymerizable composition for an optical material includes an additive as a component other than the components (A) and (B), it is also possible to suppress deterioration of the additive during polymerization.

For example, the polymerizable composition for an optical material may include at least one selected from the group consisting of an ultraviolet absorber (C), a dye (D), and a polyol compound (E).

A description will be given below of these components.

[Ultraviolet Absorber (C)]

It is possible for the polymerizable composition for an optical material of the present embodiment to further include an ultraviolet absorber (C). The ultraviolet absorber (C) is not limited and, for example, it is possible to use various ultraviolet absorbers such as a benzotriazole-based ultraviolet absorber, a triazine-based ultraviolet absorber, a benzophenone-based ultraviolet absorber, a benzoate-based ultraviolet absorber, and an oxanilide-based ultraviolet absorber.

More specific examples of the ultraviolet absorber (C) include benzophenone-based ultraviolet absorbers such as 2-hydroxy-4-methoxybenzophenone, 2-hydroxy-4-n-octoxybenzophenone, 2-hydroxy-4-n-dodecyloxybenzophenone, 2-hydroxy-4-dodecyloxybenzophenone, 2-hydroxy-4-benzyloxybenzophenone, 2,4-dihydroxybenzophenone, 1,4-bis(4-benzoyl-3-hydroxyphenoxy) butane, 5,5'-methylenebis(2-hydroxy-4-methoxybenzophenone), 2,2',4-trihydroxybenzophenone, 2,2'-dihydroxy-4-methoxybenzophenone, 2,2'-dihydroxy-4-ethoxybenzophenone, 2,2'-dihydroxy-4-n-propoxybenzophenone, 2,2'-dihydroxy-4-isopropoxybenzophenone, 2,2'-dihydroxy-4-n-butoxybenzophenone, 2,2'-dihydroxy-4-t-butoxybenzophenone, 2-hydroxy-4,4'-dimethoxybenzophenone, 2-hydroxy-4,4'-diethoxybenzophenone, 2-hydroxy-4,4'-di-n-propoxybenzophenone, 2-hydroxy-4,4'-diisopropoxybenzophenone, 2-hydroxy-4,4'-di-n-butoxybenzophenone, 2-hydroxy-4,4'-di-t-butoxybenzophenone, 2-hydroxy-4-methoxy-4'- ethoxybenzophenone, 2-hydroxy-4-methoxy-4'-n-propoxybenzophenone, 2-hydroxy-4-methoxy-4'-isopropoxybenzophenone, 2-hydroxy-4-methoxy-4'-n-butoxybenzophenone, 2-hydroxy-4-methoxy-4'-t-butoxybenzophenone, 2-hydroxy-4-ethoxy-4'-methoxybenzophenone, 2-hydroxy-4-ethoxy-4'-n-propoxybenzophenone, 2-hydroxy-4-ethoxy-4'-isopropoxybenzophenone, 2-hydroxy-4-ethoxy-4'-n-butoxybenzophenone, 2-hydroxy-4-ethoxy-4'-t-butoxybenzophenone, 2-hydroxy-4-n-propoxy-4'-methoxybenzophenone, 2-hydroxy-4-n-propoxy-4'-ethoxybenzophenone, 2-hydroxy-4-n-propoxy-4'-isopropoxybenzophenone, 2-hydroxy-4-n-propoxy-4'-n-butoxybenzophenone, 2-hydroxy-n-propoxy-4'-t-butoxybenzophenone, 2-hydroxy-4-isopropoxy-4'-methoxybenzophenone, 2-hydroxy-4-isopropoxy-4'-ethoxybenzophenone, 2-hydroxy-4-isopropoxy-4'-n-propoxybenzophenone, 2-hydroxy-4-isopropoxy-4'-n-butoxybenzophenone, 2-hydroxy-isopropoxy-4'-t-butoxybenzophenone, 2-hydroxy-4-n-butoxy-4'-methoxybenzophenone, 2-hydroxy-4-n-butoxy-4'-ethoxybenzophenone, 2-hydroxy-4-n-butoxy-4'-n-propoxybenzophenone, 2-hydroxy-4-n-butoxy-4'-isopropoxybenzophenone, 2-hydroxy-4-n-butoxy-4'-t-butoxybenzophenone, 2-hydroxy-4-t-butoxy-4'-methoxybenzophenone, 2-hydroxy-4-t-butoxy-4'-ethoxybenzophenone, 2-hydroxy-4-t-butoxy-4'-n-propoxybenzophenone, 2-hydroxy-4-t-butoxy-4'-isopropoxybenzophenone, 2-hydroxy-4-t-butoxy-4'-n-butoxybenzophenone, 2,2',4,4'-tetrahydroxybenzophenone, 2,2'-dihydroxy-4,4'-dimethoxybenzophenone, 2,2'-dihydroxy-4,4'-diethoxybenzophenone, 2,2'-dihydroxy-4,4'-di-n-propoxybenzophenone, 2,2'-dihydroxy-4,4'-di-isopropoxybenzophenone, 2,2'-dihydroxy-4,4'-di-n-butoxybenzophenone, 2,2'-dihydroxy-4,4'-di-t-butoxybenzophenone, 2,2'-dihydroxy-4-methoxy-4'-diethoxybenzophenone, 2,2'-dihydroxy-4-methoxy-4'-n-propoxybenzophenone, 2,2'-dihydroxy-4-methoxy-4'-isopropoxybenzophenone, 2,2'-dihydroxy-4-methoxy-4'-n-butoxybenzophenone, 2,2'-dihydroxy-4-methoxy-4'-t-butoxybenzophenone, 2,2'-dihydroxy-4-ethoxy-4'-n-propoxybenzophenone, 2,2'-dihydroxy-4-ethoxy-4'-isopropoxybenzophenone, 2,2'-dihydroxy-4-ethoxy-4'-n-butoxybenzophenone, 2,2'-dihydroxy-4-ethoxy-4'-t-butoxybenzophenone, 2,2'-dihydroxy-4-n-propoxy-4'-isopropoxybenzophenone, 2,2'-dihydroxy-4-n-propoxy-4'-n-butoxybenzophenone, 2,2'-dihydroxy-4-n-propoxy-4'-t-butoxybenzophenone, 2,2'-dihydroxy-4-isopropoxy-4'-n-butoxybenzophenone, 2,2'-dihydroxy-4-isopropoxy-4'-t-butoxybenzophenone, 2,2'-dihydroxy-4-n-butoxy-4'-t-butoxybenzophenone, 2,2',4-trimethoxybenzophenone, 2,2',4-triethoxybenzophenone, 2,2',4-tri-n-propoxybenzophenone, 2,2',4-triisopropoxybenzophenone, 2,2',5-trimethoxybenzophenone, 2,2',5-triethoxybenzophenone, 2,2',5-tri-n-propoxybenzophenone, 2,2',5-triisopropoxybenzophenone, 2,4,4'-trimethoxybenzophenone, 2,4,4'-triethoxybenzophenone, 2,4,4'-tri-n-propoxybenzophenone, 2,4,4'-triisopropoxybenzophenone, 3,4',5-trimethoxybenzophenone, 3,4',5-triethoxybenzophenone, 3,4',5-tri-n-propoxybenzophenone, 3,4',5-triisopropoxybenzophenone, 2,4-dimethoxy-4'-hydroxybenzophenone, 2,4-diethoxy-4'-hydroxybenzophenone, 2,4-di-n-propoxy-4'-hydroxybenzophenone, 2,4-diisopropoxy-4'-hydroxybenzophenone, 2,2',4,4'-tetramethoxybenzophenone, 2,2',4,4'-tetraethoxybenzophenone, 3,3',4,4'-tetramethoxybenzophenone, 3,3',4,4'-tetraethoxybenzophenone, 2,3,3',4'-tetramethoxybenzophenone, and 2,3,3',4'-tetraethoxybenzophenone.

In the present embodiment, it is possible to set the content of the ultraviolet absorber (C) in the polymerizable composition for an optical material to, for example, 0.05 parts by weight or more and 10 parts by weight or less with respect to 100 parts by weight of the allyl carbonate compound (A), preferably 0.10 parts by weight or more and 3 parts by weight or less.

[Dye (D)]

In the present embodiment, it is possible for the polymerizable composition for an optical material to further include a dye (D). The dye (D) is preferably at least one kind selected from the group consisting of anthraquinone-based dyes, perinone-based dyes, monoazo-based dyes, diazo-based dyes, and phthalocyanine-based dyes.

In the present embodiment, from the viewpoint of obtaining an optical material having excellent yellowness (YI) and transparency, the dye is preferably one or two or more dyes selected from the group consisting of Solvent Blue 94, Solvent Blue 97, Solvent Blue 104, Solvent Violet 59, Solvent Red 195, Disperse Red 60, Solvent Green 28, Solvent Orange 60, Plast Blue 8520, and Solvaperm Red BB.

In the present embodiment, it is possible to set the content of the dye in the polymerizable composition for an optical material to, for example, 0.1 ppm by weight or more and 100 ppm by weight or less with respect to 100 parts by weight of the allyl carbonate compound (A), and preferably 1 ppm by weight or more and 20 ppm by weight or less.

The polymerizable composition for an optical material of the present embodiment further including a specific ultraviolet absorber (C) and/or dye (D) makes it possible to obtain a resin having a good color and transparency without decomposing the ultraviolet absorber (C) and the dye (D).

[Polyol Compound (E)]

In the present embodiment, it is possible for the polymerizable composition for an optical material to further include a polyol compound (E). It is possible to represent the polyol compound (E) by General Formula (a). The polymerizable composition for an optical material further including a polyol compound (E) suppresses the generation of cracks during polymerization and cracking at the time of mold release and makes it possible to obtain a polymerizable composition for an optical material which is superior in resin molded product productivity.

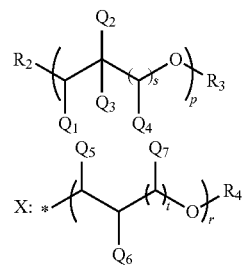

(a)

In General Formula (a), $R_2$ represents a hydroxyl group, an —OX group, or a linear or branched alkyl group having 1 to 4 carbon atoms. $R_3$ represents a hydrogen atom, an X group, or a linear or branched alkyl group having 1 to 4 carbon atoms. $R_4$ represents a hydrogen atom or a linear or branched alkyl group having 1 to 4 carbon atoms. $Q_1$ to $Q_7$ each independently represent a hydrogen atom, a linear or branched alkyl group having 1 to 4 carbon atoms, a —$CH_2$—OX group, or a —OX group. p represents an integer of 1 or more and 4 or less, s represents an integer of 0 or more and 4 or less, t represents an integer of 0 or more and 4 or less, and r represents an integer of 1 or more and 1000 or less. A plurality of $Q_1$ to $Q_7$, X, s, and t may be the same or different. * represents a bond. In addition, General Formula (a) includes two or more hydroxyl groups.

As the compound represented by General Formula (a), it is possible to use compounds having a number average molecular weight of 150 or more, preferably 200 or more.

In addition, specific examples of the polyol compound (E) include polyalkylene glycols, for example, polypropylene glycol, polyethylene glycol, and a copolymer of polyethylene glycol-polypropylene glycol.

In the present embodiment, it is possible to set the content of the polyol compound (E) in the polymerizable composition for an optical material to, for example, 0.0005 parts by weight or more and 1 part by weight or less with respect to 100 parts by weight of the allyl carbonate compound (A), preferably 0.0005 parts by weight or more and 0.5 parts by weight or less, and even more preferably 0.001 parts by weight or more and 0.5 parts by weight or less, from the viewpoint of improving the release property and suppressing cracks during polymerization.

[Other Components]

In the present embodiment, in addition to the components (A) to (E), additives such as an internal release agent and a resin modifier may be further included.

As the internal release agent, it is possible to use an acidic phosphate ester or a non-reactive silicone oil. Examples of the acidic phosphate ester include a phosphate monoester and a phosphate diester and it is possible to use each alone or in a combination of two or more types.

Examples of the resin modifier include polyoxyalkylene alkyl ether compounds, polyoxyalkylene fatty acid esters, episulfide compounds, alcohol compounds other than the polyol compound represented by General Formula (a), amine compounds, epoxy compounds, organic acids and anhydrides thereof, olefin compounds including (meth)acrylate compounds or the like, and the like.

<Method for Manufacturing Polymerizable Composition for Optical Material>

In the present embodiment, it is possible to manufacture the polymerizable composition for an optical material, for example, by mixing the components (A) and (B) described above.

Furthermore, in a case where at least one kind selected from the group consisting of the ultraviolet absorber (C) and the dye (D), and the polyol compound (E) represented by General Formula (a) is used, it is possible to prepare a polymerizable composition for an optical material by mixing the above with the components (A) and (B).

The temperature in a case of preparing the polymerizable composition by mixing the components (A) and (B) and further the components (C), (D), or (E) is usually 30° C. or lower. However, in a case where the solubility of the components (B), (C), (D) or (E), and other components in the monomer is not good, it is also possible to carry out the dissolution in the monomer in advance by heating.

<Method for Manufacturing Molded Product>

In the present embodiment, the method for manufacturing a molded product includes, for example, a step of preparing a polymerizable composition for an optical material by mixing the components (A) and (B) described above, and a step of forming a lens base material by cast polymerization of the polymerizable composition for an optical material.

Here, the component (B) includes the components (B1) and (B2) described above. It is possible for the method for manufacturing a molded product to be, for example, a method for manufacturing a plastic lens.

In addition, the step of preparing the polymerizable composition for an optical material may be a step of preparing a polymerizable composition for an optical material by further mixing at least one kind selected from the group including the components (C), (D), and (E) described above, preferably, a step of preparing a polymerizable composition for an optical material by mixing the component (E).

In the present embodiment, the method for manufacturing the resin molded product is not limited and examples of preferable manufacturing methods include cast polymerization.

First, a polymerizable composition is injected to a space in a mold held by a gasket, a tape, or the like. At this time, depending on the physical properties required for the plastic lens to be obtained, in many cases, it is preferable to carry out a defoaming treatment under reduced pressure, a filtration treatment such as pressurization and depressurization, and the like as necessary.

Since the polymerization conditions vary greatly depending on the composition of the polymerizable composition, the kind and amount of the catalyst used, the shape of the mold, and the like, the conditions are not limited, but the polymerization is performed for approximately 1 to 72 hours at a temperature of 0° C. or higher and 150° C. or lower. In some cases, it is preferable to carry out the curing while holding or gradually raising the temperature in a temperature range of 20° C. or higher and 130° C. or lower for 1 to 48 hours.

The resin molded product may be subjected to a treatment such as annealing as necessary. The treatment is usually performed at a temperature of between 50° C. or higher and 150° C. or lower, but is preferably performed at 90° C. or higher and 140° C. or lower, and more preferably performed at 100° C. or higher and 130° C. or lower.

In the present embodiment, when molding the resin, in addition to the "other components" described above, various additives such as a chain extender, a cross-linking agent, a light stabilizer, an antioxidant, an adhesion improver, and the like may be added in accordance with the purpose, in the same manner as known molding methods.

<Use>

In the present embodiment, the molded product is obtained by curing the polymerizable composition for an optical material according to the present embodiment described above. In addition, the optical material according to the present embodiment is formed of the molded product described above. More specifically, it is possible to obtain the poly(allyl carbonate) resin obtained from the polymerizable composition for an optical material of the present embodiment as molded products of various shapes by changing the type of mold at the time of casting polymerization.

With the molded product in the present embodiment, it is possible to obtain a molded product having excellent surface hardness and color without impairing the transparency and also to obtain a molded product with excellent moldability as the generation of leakage from a mold during polymerization is suppressed and in which optical distortion is suppressed, and the product yield is improved.

It is possible to suitably use the polymerizable composition for an optical material, which is a raw material of a molded product, for various optical materials such as plastic lenses which are excellent in ultraviolet ray cut performance and light resistance, transparent, and excellent in appearance by further including specific components (C) and (D) in addition to the components (A) and (B). In addition, the polymerizable composition for an optical material, which is a raw material of a molded product, further including a specific polyol (E) in addition to the components (A) and (B) suppresses the generation of cracks during polymerization and cracking at the time of mold release and also makes it possible to obtain excellent productivity.

[Plastic Spectacle Lens]

The plastic lens of the present embodiment is, for example, formed of the molded product in the present embodiment described above.

In addition, in the present embodiment, a plastic spectacle lens using a lens base material formed of a molded product may be used by applying a coating layer on one surface or both surfaces as necessary.

The plastic spectacle lens in the present embodiment is formed of a lens base material formed of the polymerizable composition described above and a coating layer.

Specific examples of the coating layer include a primer layer, a hard coat layer, an anti-reflection layer, an anti-fog coating layer, an anti-fouling layer, a water repellent layer, and the like. It is also possible to use each of these coating layers alone, or to use a plurality of coating layers in multiple layers. In a case of applying coating layers on both surfaces, the same coating layer may be applied to each side or different coating layers may be applied to each side.

In each of these coating layers, an infrared absorber for the purpose of protecting eyes from infrared rays, a light stabilizer, an antioxidant, and a photochromic compound for the purpose of improving the weather resistance of the lens, and a dye or a pigment for the purpose of improving the fashionability of the lens, an anti-static agent, and other known additives for improving the performance of the lens may be used in combination.

Various leveling agents for the purpose of improving applicability may be used for layers to be coated by application.

The primer layer is usually formed between a hard coat layer described below and a lens. The primer layer is a coating layer for the purpose of improving the adhesion between the hard coat layer formed thereon and the lens, and in some cases, it is also possible to improve the impact resistance. It is possible to use any material as the primer layer as long as the material has high adhesion to the obtained lens, but in general, a primer composition with a main component of a urethane-based resin, an epoxy-based resin, a polyester-based resin, a melanin-based resin, a polyvinyl acetal, or the like is used. The primer composition may be used with an appropriate solvent which does not affect the lens, for the purpose of adjusting the viscosity of the composition. Naturally, the primer composition may be used without a solvent.

It is also possible to form the primer layer by either method of a coating method or a drying method. In a case of using a coating method, a primer layer is formed by coating the primer composition on a lens by a known coating method such as spin coating, dip coating, or the like and then solidifying the primer composition. In a case where the drying method is used, the primer layer is formed by a known drying method such as a CVD method or a vacuum deposition method. When forming the primer layer, the surface of the lens may be subjected to a pretreatment such as an alkali treatment, a plasma treatment, an ultraviolet treatment, and the like as necessary for the purpose of improving the adhesion.

The hard coat layer is a coating layer for the purpose of imparting functions such as scratch resistance, abrasion resistance, moisture resistance, hot water resistance, heat resistance, weather resistance, and the like to the lens surface.

Generally, for the hard coat layer, a hard coat composition including an organosilicon compound having curability and one or more kinds of oxide fine particles of elements selected from the group consisting of the element group of Si, Al, Sn, Sb, Ta, Ce, La, Fe, Zn, W, Zr, In, and Ti and/or one kind or more of fine particles formed of composite oxides of two or more kinds of elements selected from these element groups is used.

In addition to the above components, it is preferable for the hard coat composition to include at least any one of amines, amino acids, metal acetylacetonate complexes, metal salts of organic acids, perchloric acids, salts of perchloric acids, acids, metal chlorides, and multi-functional epoxy compounds. The hard coat composition may be used with an appropriate solvent which does not affect the lens or may be used without a solvent.

The hard coat layer is usually formed by coating a hard coat composition by a known coating method such as spin coating or dip coating and then curing the composition. Examples of curing methods include heat curing, curing methods using energy ray irradiation such as ultraviolet rays or visible light, and the like. In order to suppress the occurrence of interference fringes, it is preferable that the difference in refractive index of the hard coat layer and the lens be within a range of 0.1.

The anti-reflection layer is usually formed on the hard coat layer as necessary. There are inorganic type and organic type anti-reflection layers and, in the case of an inorganic type, inorganic oxides such as $SiO_2$ and $TiO_2$ are used and the anti-reflection layer is formed by a drying method such as a vacuum deposition method, a sputtering method, an ion plating method, an ion beam assist method, or a CVD method. In the case of an organic type, the anti-reflection layer is formed by a wet method using an organosilicon compound and a composition including silica-based fine particles having a internal cavity.

The anti-reflection layer may be a single layer or multiple layers and in the case of use as a single layer, it is preferable that the refractive index be lower than the refractive index of the hard coat layer by at least 0.1. In order to effectively exhibit the anti-reflection function, it is preferable to form a multiple-layer anti-reflection film, in which case a low refractive index film and a high refractive index film are alternately laminated. Also, in this case, the refractive index difference between the low refractive index film and the high refractive index film is preferably 0.1 or more. Examples of high refractive index films include films of ZnO, $TiO_2$, $CeO_2$, $Sb_2O_5$, $SnO_2$, $ZrO_2$, $Ta_2O_5$, and the like and examples of low refractive index films include $SiO_2$ films and the like.

On the anti-reflection layer, an anti-fog layer, an anti-fouling layer, a water repellent layer may be formed, as necessary. For the method for forming the anti-fog layer, the anti-fouling layer, and the water repellent layer, the processing methods, the processing materials, and the like are not limited as long as there is no adverse effect on the anti-reflection function and it is possible to use known anti-fog treatment methods, anti-fouling treatment methods, water repellent treatment methods, and materials. Examples of anti-fog treatment methods and anti-fouling treatment methods include a method of covering the surface with a surfactant, a method of adding a hydrophilic film to the surface to impart water absorbency, a method of covering the surface with fine irregularities to increase water absorbency, a method of using photocatalytic activity to impart water absorbency, a method of carrying out a super water repellent treatment to prevent adhesion of water droplets, and the like. In addition, examples of water repellent treatment methods include a method of forming a water repellent treated layer by vapor deposition or sputtering of a fluorine-containing silane compound or the like, a method of dissolving the fluorine-containing silane compound in a solvent, followed by coating to form a water repellent treated layer, and the like.

[Plastic Polarized Lens]

The plastic polarizing lens of the present embodiment includes a polarizing film, and a base material layer formed over at least one surface of the polarizing film and formed of the molded product obtained by curing the polymerizable composition for an optical material of the present embodiment.

It is possible to form the polarizing film in the present embodiment of a thermoplastic resin. Examples of thermoplastic resins include polyester resin, polycarbonate resin, polyolefin resin, polyimide resin, polyvinyl alcohol resin, polyvinyl chloride resin, and the like. From the viewpoints of water resistance, heat resistance, and molding processability, polyester resins and polycarbonate resins are preferable as the thermoplastic resin, and polyester resins are more preferable.

Examples of polyester resins include polyethylene terephthalate, polyethylene naphthalate, polybutylene terephthalate, and the like, and from the viewpoints of water resistance, heat resistance, and molding processability, polyethylene terephthalate is preferable.

Specific examples of polarizing films include a polyester polarizing film containing a dichroic dye, a polyvinyl alcohol polarizing film containing iodine, a polyvinyl alcohol polarizing film containing a dichroic dye, and the like.

The polarizing film may be used after being subjected to heat treatment for drying and stabilization.

Furthermore, in order to improve the adhesion to the acrylic-based resin, the polarizing film may be used after performing at least one kind of pretreatment selected from a primer coating treatment, a chemical treatment (for example, a gas treatment or chemical liquid treatment such as an alkali), a corona discharge treatment, a plasma treatment, an ultraviolet irradiation treatment, an electron beam irradiation treatment, a surface roughening treatment, a flame treatment, and the like. Among such pretreatments, one kind or two or more kinds selected from a primer coating treatment, a chemical treatment, a corona discharge treatment, and a plasma treatment are particularly preferable.

In the plastic polarizing lens of the present embodiment, a base material layer obtained by curing the polymerizable composition for an optical material of the present embodiment is laminated on the surface on the objective surface side or the surface on the ocular surface side of the polarizing film or on both surfaces of the objective surface side surface and the ocular surface side-surface.

The method for manufacturing the plastic polarizing lens of the present embodiment is not limited, but examples thereof include a method of attaching a lens base material on both surfaces of a polarizing film, a method of polymerization casting a polymerizable composition on both surfaces of a polarizing film, and the like. In the present embodiment, a description will be given of an example formed by a cast polymerization method.

It is possible for the method for manufacturing the plastic polarizing lens of the present embodiment to include, for example, a step of forming a first polymerizable composition layer on the objective surface side surface of the polarizing film in a mold and forming a second polymerizable composition layer on the other surface of the polarizing film, and a step of polymerizing and curing the polymerizable composition layer to laminate the base material layer on both surfaces of the polarizing film.

A lens casting mold is generally formed of two substantially disc-shaped glass molds held by a gasket. In the space inside this lens casting mold, a polarizing film is installed so as to be parallel to the mold inner surface on the front side opposite to the film surface. Gaps are formed between the polarizing film and the mold. The polarizing film may be pre-formed. Then, it is possible to inject a first polymerizable composition between the mold and a surface on the objective surface side of the polarizing film to form the layer of the first polymerizable composition, and then inject the second polymerizable composition into the gap between the surface on the ocular surface side of the polarizing film and the mold to form the layer of the second polymerizable composition.

In addition, it is also possible to perform this step by placing the first polymerizable composition on the forming surface for forming the objective surface of the lens of the mold, spreading the first polymerizable composition over the entire surface of the forming surface with the polarizing film, separating the mold and the surface on the objective surface side of the polarizing film by a predetermined distance via the layer formed of the first polymerizable composition and then injecting the second polymerizable composition into the gap between the polarizing film and the forming surface of the mold for forming the spectacle surface of the lens and forming the layer of the second polymerizable composition.

The polymerization conditions of the polymerizable composition vary according to the composition of the polymerizable composition, the kind and amount of the catalyst used, the shape of the mold, and the like, but the polymerization is performed at a temperature of 5 to 140° C. for 1 to 50 hours, for example. In some cases, it is preferable to hold or gradually raise the temperature in a temperature range of 5 to 130° C. to carry out the curing in 1 to 25 hours.

Releasing the laminate cured by polymerization from the mold makes it possible to obtain the plastic polarizing lens of the present embodiment.

In the present embodiment, the laminate after polymerization/release may be subjected to a heat treatment such as annealing as necessary. From the viewpoint of the effect of the present invention, the treatment is performed at a temperature of between 80° C. or higher and 150° C. or lower, preferably at 90° C. or higher and 140° C. or lower, and more preferably at 100° C. or higher and 130° C. or lower. From the viewpoint of the effect of the present invention, the treatment time is, for example, in the range of 1 hour or more and 10 hours or less, and preferably 2 hours or more and 5 hours or less.

Here, a coating layer similar to a plastic spectacle lens may be formed on the surface of the obtained base material layer.

EXAMPLES

A specific description will be given below of the present invention based on Examples, but the present invention is not limited to these Examples. The evaluation of the molded product and the plastic lens formed of the cured resin was carried out by the following method.

In the present Example, the polymerizable composition was cured and molded by using a mold in which the outer peripheries of two glass molds having the following curved surfaces were wound with an adhesive tape so as to be assembled in parallel to each other with a gap therebetween.

(Mold 1)
  Base curve: convex surface: 4.00, concave surface: 4.00
  Center thickness: 8 mm
  Mold diameter: 81 mm
(Mold 2)
  Base curve: convex surface: 4.00, concave surface: 4.00
  Center thickness: 2 mm
  Mold diameter: 81 mm
(Mold 3)
  Base curve: convex surface: 0.00, concave surface: 0.00
  Center thickness: 6 mm
  Mold diameter: 80 mm

[Evaluation of Physical Properties]

1) Monomer Leakage Rate

The amount of the monomer injected into the mold 1 and the weight of the resin after polymerization were measured, and the ratio of the monomer which leaked from the mold in the oven after the injection was defined by the following formula and determined as the monomer leakage rate.
  Monomer injection amount=X (g)
  Resin weight after polymerization=Y (g)
  Monomer leakage amount=X−Y (g)
  Monomer leakage rate=(X−Y)/X×100 (%)

(2) Optical Distortion

A resin having a thickness of 8 mm molded in the mold 1 was visually observed using a strain tester SVP-100 manufactured by Toshiba Corporation and resin with optical distortion was set as x, and resin with no distortion was set as A.

(3) Rockwell Hardness (M): Rockwell Hardness of Resin with a Thickness of 6 mm Molded by a Mold 3 was Measured on an M Scale in Accordance with ISO2039-2.

(4) Resin Color: YI, L *, a *, b *

The color of the resin with a thickness of 2 mm molded by the mold 2 was measured using a spectrophotometer CM-5 manufactured by Konica Minolta in accordance with ASTM E313-73.

[Lens Cracks]

At the time of completion of polymerization of the lens molded by the mold 1, the state of cracks before release was evaluated as follows.
  A: No cracks
  B: Cracks in a portion within 5 mm from lens periphery
  x: Cracks in a portion 5 mm or more inside from lens periphery

[Lens Release Property]

In a case where a molded product was released from the mold 1, the release property was evaluated as follows.
  A+: Release is possible with a light force at the time of mold release
  A: Strong force is required at the time of mold release, but release is possible without any problem
  B: A strong force is required at the time of mold release, and problems such as cracks are generated in the molded product
  x: Release not possible In the Examples and Comparative Examples, the following components were used.

(Allyl Carbonate Compound (A))
  RAV 7MC (poly(allyl carbonate) compound of diethylene glycol, neopentyl glycol, and pentaerythritol, and an oligomer thereof, manufactured by ACOMON)

(Radical Polymerization Initiator (B))
  (B1-1) LUPEROX 546M75 (75% solution of t-amylperoxyneodecanoate, manufactured by ARKEMA Yoshitomi Ltd., 54.5% radical residual ratio after 5 hours at 50° C., 30.1% radical residual ratio after 5 hours at 55° C.)
  Perbutyl ND (70% solution of t-butylperoxyneodecanoate, manufactured by NOF Corporation, 57.5% radical residual ratio after 5 hours at 50° C., 34.6% radical residual ratio after 5 hours at 55° C.)
  (B2-1) LUPEROX 531M80 (80% solution of 1,1-di(t-amylperoxy)cyclohexane, manufactured by ARKEMA Yoshitomi, Ltd., 63.8% radical residual ratio after 5 hours at 95° C., 42.9% radical residual ratio after 5 hours at 100° C.)
  (B2-2) LUPEROX TAEC (t-amylperoxy-2-ethylhexyl carbonate, manufactured by ARKEMA Yoshitomi, Ltd., 80.9% radical residual ratio after 5 hours at 95° C., 67.6% radical residual ratio after 5 hours at 100° C.)

(Ultraviolet Absorber (C))
  (C1) SEESORB 101 (2-hydroxy-4-methoxybenzophenone, manufactured by Shipro Kasei Kaisha, Ltd.)
  (C2) SEESORB 107 (2,2'-dihydroxy-4,4'-dimethoxybenzophenone, manufactured by Shipro Kasei Kaisha, Ltd.)

(Dye (D))
  (D1) Plast Blue 8520 (Solvent Blue 94, manufactured by Arimoto Chemical Co., Ltd.)
  (D2) Solvaperm Red BB (Solvent Red 195, manufactured by Clariant AG)

(Polyol Compound (E))
  (E-1) PPG-1000: polypropylene glycol, diol type, 1000 (average molecular weight 1000, manufactured by Mitsui Chemicals, Inc., product name Actcall D-1000)

Example 1

0.1 parts by weight of SEESORB 101 (manufactured by Shipro Kasei Kaisha, Ltd.) were dissolved at 80° C. in 98.6 parts by weight of RAV 7MC (manufactured by ACOMON) and cooled to room temperature, then, as radical polymerization initiators, 0.5 parts by weight of LUPEROX 546M75 (manufactured by ARKEMA Yoshitomi, Ltd.) (t-amylperoxyneodecanoate, 0.375 parts by weight) and 0.8 parts by weight of LUPEROX 531M80 (manufactured by ARKEMA Yoshitomi, Ltd.) (1,1-di(t-amylperoxy)cyclohexane, 0.64 parts by weight) were added thereto, and, after degassing under reduced pressure, the result was injected into each mold of the mold 1, the mold 2, and the mold 3 to carry out polymerization while gradually increasing the temperature from 25° C. to 110° C.

Thereafter, after cooling to 60° C., the molded product was released from each mold. The obtained molded product was annealed at 120° C. for 2 hours. Table 1 shows the results of the evaluation of monomer leakage and lens cracks during polymerization, the mold release property of the lens, optical distortion, and Rockwell hardness of the obtained lens.

Example 2

0.1 parts by weight of SEESORB 101 (manufactured by Shipro Kasei Kaisha, Ltd.) was dissolved at 80° C. in 98.2 parts by weight of RAV 7MC (manufactured by ACOMON)

and cooled to room temperature, then, as radical polymerization initiators, 0.5 parts by weight of LUPEROX 546M75 (manufactured by ARKEMA Yoshitomi, Ltd.) (t-amylperoxyneodecanoate, 0.375 parts by weight) and 1.2 parts by weight of LUPEROX TAEC (manufactured by ARKEMA Yoshitomi, Ltd.) (t-amylperoxy 2-ethylhexyl carbonate, 1.2 parts by weight) were added thereto, and, after degassing under reduced pressure, the result was injected into each of the molds to carry out polymerization while gradually increasing the temperature from 25° C. to 115° C.

Thereafter, after cooling to 60° C., the molded product was released from each mold. Evaluation was performed in the same manner as in Example 1 and the evaluation results are shown in Table 1.

Example 3

0.75 parts by weight of SEESORB 107 (manufactured by Shipro Kasei Kaisha, Ltd.), 5 ppm of Plast Blue 8520 (manufactured by Arimoto Chemical Co., Ltd.), and 2.75 ppm of Solvaperm Red BB (manufactured by Clariant AG) were dissolved at 80° C. in 97.95 parts by weight of RAV 7MC (manufactured by ACOMON) and cooled to room temperature, then, as radical polymerization initiators, 0.5 parts by weight of LUPEROX 546M75 (manufactured by ARKEMA Yoshitomi, Ltd.) (t-amylperoxyneodecanoate, 0.375 parts by weight) and 0.8 parts by weight of LUPEROX 531M80 (manufactured by ARKEMA Yoshitomi, Ltd.) (1,1-di(t-amylperoxy)cyclohexane, 0.64 parts by weight) were added thereto, and, after degassing under reduced pressure, the result was injected into each of the molds to carry out polymerization while gradually increasing the temperature from 25° C. to 110° C.

Thereafter, after cooling to 60° C., the molded product was released from each mold. Evaluation was performed in the same manner as in Example 1 and the evaluation results are shown in Table 1.

Example 4

0.75 parts by weight of SEESORB 107 (manufactured by Shipro Kasei Kaisha, Ltd.), 5 ppm of Plast Blue 8520 (manufactured by Arimoto Chemical Co., Ltd.), and 2.75 ppm of Solvaperm Red BB (manufactured by Clariant AG) were dissolved at 80° C. in 97.55 parts by weight of RAV 7MC (manufactured by ACOMON) and cooled to room temperature, then, as radical polymerization initiators, 0.5 parts by weight of LUPEROX 546M75 (manufactured by ARKEMA Yoshitomi, Ltd.) (t-amylperoxyneodecanoate, 0.375 parts by weight) and 1.2 parts by weight of LUPEROX TAEC (manufactured by ARKEMA Yoshitomi, Ltd.) (t-amylperoxy2-ethylhexyl carbonate, 1.2 parts by weight) were added thereto, and, after degassing under reduced pressure, the result was injected into each of the molds to carry out polymerization while gradually increasing the temperature from 25° C. to 115° C.

Thereafter, after cooling to 60° C., the molded product was released from each mold. Evaluation was performed in the same manner as in Example 1 and the evaluation results are shown in Table 1.

Example 5

0.1 parts by weight of SEESORB 101 (manufactured by Shipro Kasei Kaisha, Ltd.) was dissolved at 80° C. in 98.6 parts by weight of RAV 7MC (manufactured by ACOMON) and cooled to room temperature, then, as radical polymerization initiators, 0.5 parts by weight of LUPEROX 546M75 (manufactured by ARKEMA Yoshitomi, Ltd.) (t-amylperoxyneodecanoate, 0.375 parts by weight) 0.8 parts by weight of LUPEROX 531M80 (manufactured by ARKEMA Yoshitomi, Ltd.) (1,1-di(t-amylperoxy)cyclohexane, 0.64 parts by weight), and 1000 ppm of PPG-1000 (manufactured by Wako Pure Chemical Industries, Ltd.) were added thereto, and, after degassing under reduced pressure, the result was injected into each of the molds to carry out polymerization while gradually increasing the temperature from 25° C. to 110° C. Thereafter, after cooling to 60° C., the molded product was released from each mold. Evaluation was performed in the same manner as in Example 1 and the evaluation results are shown in Table 1.

Example 6

0.75 parts by weight of SEESORB 107 (manufactured by Shipro Kasei Kaisha, Ltd.), 5 ppm of Plast Blue 8520 (manufactured by Arimoto Chemical Co., Ltd.), and 2.75 ppm of Solvaperm Red BB (manufactured by Clariant AG) were dissolved at 80° C. in 97.95 parts by weight of RAV 7MC (manufactured by ACOMON) and cooled to room temperature, then, as radical polymerization initiators, 0.5 parts by weight of LUPEROX 546M75 (manufactured by ARKEMA Yoshitomi, Ltd.) (t-amylperoxyneodecanoate, 0.375 parts by weight), 0.8 parts by weight of LUPEROX 531M80 (manufactured by ARKEMA Yoshitomi, Ltd.) (1,1-di(t-amylperoxy)cyclohexane, 0.64 parts by weight), and 1000 ppm of PPG-1000 (manufactured by Wako Pure Chemical Industries, Ltd.) were added thereto, and, after degassing under reduced pressure, the result was injected into each of the molds to carry out polymerization while gradually increasing the temperature from 25° C. to 110° C. Thereafter, after cooling to 60° C., the molded product was released from each mold. Evaluation was performed in the same manner as in Example 1 and the evaluation results are shown in Table 1.

Comparative Example 1

0.1 parts by weight of SEESORB 101 (manufactured by Shipro Kasei Kaisha, Ltd.) was dissolved at 80° C. in 98.6 parts by weight of RAV 7MC (manufactured by ACOMON) and cooled to room temperature, then, as radical polymerization initiators, 0.5 parts by weight of Perbutyl ND (manufactured by NOF Corporation) (t-butyl peroxyneodecanoate, 0.35 parts by weight) and 0.8 parts by weight of LUPEROX 531M80 (manufactured by ARKEMA Yoshitomi, Ltd.) (1,1-di(t-amylperoxy)cyclohexane, 0.64 parts by weight) were added thereto, and, after degassing under reduced pressure, the result was injected into each of the molds to carry out polymerization while gradually increasing the temperature from 25° C. to 110° C. Thereafter, after cooling to 60° C., the molded product was released from each mold. Evaluation was performed in the same manner as in Example 1 and the evaluation results are shown in Table 1.

Comparative Example 2

0.1 parts by weight of SEESORB 101 (manufactured by Shipro Kasei Kaisha, Ltd.) was dissolved at 80° C. in 99.1 parts by weight of RAV 7MC (manufactured by ACOMON) and cooled to room temperature, then, as radical polymerization initiators, 0.8 parts by weight of LUPEROX 531M80 (manufactured by ARKEMA Yoshitomi, Ltd.) (1,1-di(t-amylperoxy)cyclohexane, 0.64 parts by weight) were added thereto, and, after degassing under reduced pressure, the result was injected into each of the molds to carry out polymerization while gradually increasing the temperature from 25° C. to 110° C. Thereafter, after cooling to 60° C., the molded product was released from each mold. Evaluation was performed in the same manner as in Example 1 and the evaluation results are shown in Table 1.

Comparative Example 3

0.1 parts by weight of SEESORB 101 (manufactured by Shipro Kasei Kaisha, Ltd.) was dissolved at 80° C. in 98.7 parts by weight of RAV 7MC (manufactured by ACOMON) and cooled to room temperature, then, as a radical polymerization initiator, 1.2 parts by weight of LUPEROX TAEC (manufactured by ARKEMA Yoshitomi, Ltd.) were added thereto, and, after degassing under reduced pressure, the result was injected into each of the molds to carry out polymerization while gradually increasing the temperature from 25° C. to 115° C. Thereafter, after cooling to 60° C., the molded product was released from each mold. Evaluation was performed in the same manner as in Example 1 and the evaluation results are shown in Table 1.

Comparative Example 4

0.75 parts by weight of SEESORB 107 (manufactured by Shipro Kasei Kaisha, Ltd.) was dissolved at 80° C. in 98.45 parts by weight of RAV 7MC (manufactured by ACOMON) and cooled to room temperature, then, as a radical polymerization initiator, 0.8 parts by weight of LUPEROX 531M80 (manufactured by ARKEMA Yoshitomi, Ltd.) (1,1-di(t-amylperoxy)cyclohexane, 0.64 parts by weight) were added thereto, and, after degassing under reduced pressure, the result was injected into each of the molds to carry out polymerization while gradually increasing the temperature from 25° C. to 110° C. Thereafter, after cooling to 60° C., the molded product was released from each mold. Evaluation was performed in the same manner as in Example 1 and the evaluation results are shown in Table 1.

Comparative Example 5

0.75 parts by weight of SEESORB 107 (manufactured by Shipro Kasei Kaisha, Ltd.) was dissolved at 80° C. in 98.05 parts by weight of RAV 7MC (manufactured by ACOMON) and cooled to room temperature, then, as a radical polymerization initiator, 1.2 parts by weight of LUPEROX TAEC (manufactured by ARKEMA Yoshitomi, Ltd.) were added thereto, and, after degassing under reduced pressure, the result was injected into each of the molds to carry out polymerization while gradually increasing the temperature from 25° C. to 115° C. Thereafter, after cooling to 60° C., the molded product was released from each mold. Evaluation was performed in the same manner as in Example 1 and the evaluation results are shown in Table 1.

Comparative Example 6

0.1 parts by weight of SEESORB 101 (manufactured by Shipro Kasei Kaisha, Ltd.) was dissolved at 80° C. in 97.9 parts by weight of RAV 7MC (manufactured by ACOMON) and cooled to room temperature, then, as a radical polymerization initiator, 2 parts by weight of LUPEROX 546M75 (manufactured by ARKEMA Yoshitomi, Ltd.) (t-amylperoxyneodecanoate, 1.5 parts by weight) were added thereto, and, after degassing under reduced pressure, the result was injected into each of the molds to carry out polymerization while gradually increasing the temperature from 25° C. to 110° C. Thereafter, after cooling to 60° C., the molded product was released from each mold. Evaluation was performed in the same manner as in Example 1 and the evaluation results are shown in Table 1. For all of the molds, the molded lenses were not completely polymerized and release was not possible.

Comparative Example 7

0.1 parts by weight of SEESORB 101 (manufactured by Shipro Kasei Kaisha, Ltd.) was dissolved at 80° C. in 97.9 parts by weight of RAV 7MC (manufactured by ACOMON) and cooled to room temperature, then, as a radical polymerization initiator, 2 parts by weight of Perbutyl ND (manufactured by NOF Corporation) (t-butyl peroxyneodecanoate, 1.4 parts by weight) were added thereto, and, after degassing under reduced pressure, the result was injected into each of the molds to carry out polymerization while gradually increasing the temperature from 25° C. to 110° C. Thereafter, after cooling to 60° C., the molded product was released from each mold. Evaluation was performed in the same manner as in Example 1 and the evaluation results are shown in Table 1. For all of the molds, the molded lenses were not completely polymerised and release was not possible.

TABLE 1

| | Unit | Example 1 | Example 2 | Example 3 | Example 4 | Example 5 | Example 6 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|---|---|
| Allyl carbonate compound | (A) | Parts by weight | 98.6 | 98.2 | 97.95 | 97.55 | 98.6 | 97.95 | 98.6 | 99.1 | 98.7 | 98.45 | 98.05 | 97.9 | 97.9 |
| Radical Polymerization Initiator | (B1-1) | Parts by weight | 0.5 | 0.5 | 0.5 | 0.5 | 0.5 | 0.5 | — | — | — | — | — | 2 | — |
| | (B2-1) | Parts by weight | 0.8 | — | 0.8 | — | 0.8 | 0.8 | — | 0.8 | — | 0.8 | — | — | — |
| | (B2-2) | Parts by weight | — | 1.2 | — | 1.2 | — | — | — | — | 1.2 | — | 1.2 | — | — |
| | Perbutyl ND | Parts by weight | — | — | — | — | — | — | 0.5 | — | — | — | — | — | 2 |
| Ultraviolet Absorber | (C1) | Parts by weight | 0.1 | 0.1 | — | — | 0.1 | — | 0.1 | 0.1 | 0.1 | — | — | 0.1 | 0.1 |
| | (C2) | Parts by weight | — | — | 0.75 | 0.75 | — | 0.75 | — | — | — | 0.75 | 0.75 | — | — |
| Dye | (D1) | ppm | — | — | 5 | 5 | — | 5 | — | — | — | — | — | — | — |
| | (D2) | ppm | — | — | 2.75 | 2.75 | — | 2.75 | — | — | — | — | — | — | — |
| Polyol compound | (E) | ppm | — | — | — | — | 1000 | 1000 | — | — | — | — | — | — | — |
| Monomer leakage rate | | % | 0.58 | 0.84 | 0.36 | 0.90 | 0.72 | 0.67 | 1.37 | 1.84 | 2.23 | 1.98 | 2.19 | — | — |
| Resin color | L* | | 97.05 | 97.03 | 95.19 | 95.31 | 97.07 | 95.15 | 97.07 | 97.06 | 97.04 | 97.00 | 96.99 | | |
| | a* | | -0.11 | -0.19 | -2.15 | -2.43 | -0.11 | -2.20 | -0.11 | -0.11 | -0.23 | -2.71 | -3.02 | | |
| | b* | | 0.38 | 0.56 | 3.57 | 4.85 | 0.36 | 3.66 | 0.36 | 0.39 | 0.65 | 4.81 | 5.51 | | |
| | YI | | 0.44 | 0.72 | 5.34 | 7.26 | 0.42 | 5.48 | 0.42 | 0.45 | 0.86 | 7.09 | 8.11 | | |
| Rockwell hardness | After annealing | (M scale) | 92.9 | 97.1 | 92.3 | 96.2 | 92.7 | 91.8 | 93.5 | 95.6 | 98.4 | 94.3 | 98.6 | | |
| Other evaluation | Lens cracks | | A | A | A | A | A | A | A | B | x | D | x | A | A |
| | Lens release property | | A | A | A | A | A+ | A+ | A | A | A | A | A | x | x |
| | Optical distortion | | A | A | A | A | A | A | A | x | x | x | x | — | — |

This application claims priority based on Japanese Laid-open Patent Publication No. 2017-234169 filed on Dec. 6, 0017, the entire disclosure of which is hereby incorporated by reference.

The invention claimed is:

1. A polymerizable composition for an optical material, comprising:
an allyl carbonate compound (A) including two or more terminal allyloxycarbonyl groups which is represented by General Formula (1); and
a radical polymerization initiator (B) including a combination of a radical polymerization initiator (B1) and a radical polymerization initiator (B2),
wherein the radical polymerization initiator (B1) is a peroxyester-based radical polymerization initiator,
the radical polymerization initiator (B2) is at least one kind selected from the group consisting of a peroxyester-based radical polymerization initiator and a peroxyketal-based radical polymerization initiator, and
the radical polymerization initiator (B1) is contained 0.2 parts by weight or more and 0.7 part by weight or less, and the radical polymerization initiator (B2) is contained 0.8 parts by weight or more and 3.0 parts by weight or less, with respect to 100 parts by weight of the allyl carbonate compound (A),

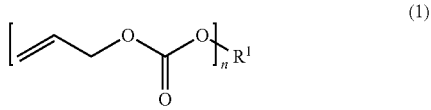

wherein, in General Formula (1), $R^1$ represents a divalent to 20 valent group derived from a chained or branched aliphatic polyol with 3 to 35 carbon atoms which optionally include a hetero atom, or a divalent to 20 valent group derived from a cycloaliphatic polyol with 5 to 40 carbon atoms which optionally include a hetero atom, n represents an integer of 2 to 20, and $R^1$ does not include an allyloxycarbonyl group,
wherein the peroxyester-based radical polymerization initiator used as the radical polymerization initiator (B1) includes t-hexylperoxypivalate, t-hexylperoxyneodecanoate, 1,1,3,3-tetramethylbutylperoxyneodecanoate, t-amylperoxyneodecanoate, or t-amylperoxypivalate,
the peroxyester-based radical polymerization initiator used as the radical polymerization initiator (B2) includes t-butylperoxyisononanoate, t-amylperoxy normal octanoate, or t-amylperoxyisononanoate,
the peroxyketal-based radical polymerization initiator used as the radical polymerization initiator (B2) includes n-butyl-4,4-di(t-butylperoxy) valerate, 2,2-bis(4,4-di-t-butylperoxycyclohexyl) propane, or 2,2-di(t-butylperoxy) butane.

2. The polymerizable composition for an optical material according to claim 1,
wherein the allyl carbonate compound (A) includes at least one kind selected from the group consisting of a bis(allyl carbonate) compound of at least one kind of diol selected from the group consisting of diethylene glycol, dipropylene glycol, triethylene glycol, tetraethylene glycol, 1,3-propanediol, 1,4-butanediol, 1,5-pentanediol, 1,6-hexanediol, neopentyl glycol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, and 4,8-bis(hydroxymethyl)-[5.2.1.0$^{2,6}$]tricyclodecane; a tris(allyl carbonate) compound of at least one kind of triol selected from the group consisting of glycerol, trimethylolpropane, and tris(hydroxyethyl) isocyanurate; a tetra(allyl carbonate) compound of at least one kind of tetraol selected from the group consisting of pentaerythritol, diglycerol, and ditrimethylolpropane; a hexa(allyl carbonate) compound of dipentaerythritol; and a hexa(allyl carbonate) compound of bispentaerythritol,
the polymerizable composition for an optical material comprising the allyl carbonate compound (A) or a mixture of the allyl carbonate compound (A) and an oligomer thereof.

3. The polymerizable composition for an optical material according to claim 1,
wherein the allyl carbonate compound (A) is at least one kind selected from the group consisting of
(i) a diethylene glycol bis(allyl carbonate) compound,
(ii) a bis(allyl carbonate) compound of a mixture of diethylene glycol and neopentyl glycol,
(iii) a poly(allyl carbonate) compound of a mixture of diethylene glycol and tris(hydroxyethyl) isocyanurate,
(iv) a poly(allyl carbonate) compound of a mixture of diethylene glycol and trimethylolpropane,
(v) a poly(allyl carbonate) compound of a mixture of diethylene glycol and pentaerythritol,
(vi) a poly(allyl carbonate) compound of a mixture of diethylene glycol, neopentyl glycol and pentaerythritol, and
(vii) a poly(allyl carbonate) mixture of a poly(allyl carbonate) compound of a mixture of diethylene glycol, neopentyl glycol, and pentaerythritol,
the polymerizable composition for an optical material including a mixture of the allyl carbonate compound (A) and an oligomer thereof.

4. The polymerizable composition for an optical material according to claim 1, further comprising:
a polyol compound (E) represented by General Formula (a);

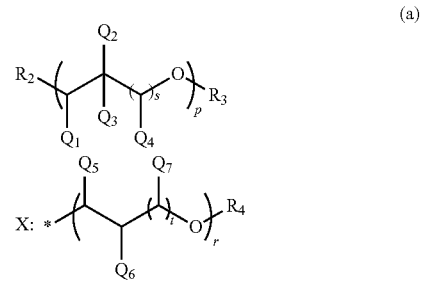

wherein, in General Formula (a), $R_2$ represents a hydroxyl group, an —OX group, or a linear or branched alkyl group having 1 to 4 carbon atoms, $R_3$ represents a hydrogen atom, an X group, or a linear or branched alkyl group having 1 to 4 carbon atoms, $R_4$ represents a hydrogen atom or a linear or branched alkyl group having 1 to 4 carbon atoms, $Q_1$ to $Q_7$ each independently represent a hydrogen atom, a linear or branched alkyl group having 1 to 4 carbon atoms, a —CH$_2$—OX group, or a —OX group, p represents an integer of 1 to 4, s represents an integer of 0 to 4, t represents an integer of 0 to 4, r represents an integer of 1 or more and 1000 or less, a plurality of $Q_1$ to $Q_7$, X, s, and t may be the same or different, and * represents a bond.

5. A molded product obtained by curing the polymerizable composition for an optical material according to claim 1.

6. An optical material comprising:
the molded product according to claim 5.

7. A plastic lens comprising:
the molded product according to claim 5.

8. A plastic polarizing lens, comprising:
a polarizing film; and
a base layer comprised of the molded product according to claim 5 and formed over at least one surface of the polarizing film.

9. A method for manufacturing a plastic lens, comprising:
a step of forming a lens base material by cast polymerization of the polymerizable composition according to claim 1.

* * * * *